United States Patent [19]
Boyadjieff et al.

[11] 3,729,276
[45] Apr. 24, 1973

[54] ACTUATOR ASSEMBLY
[75] Inventors: George I. Boyadjieff, Woodland Hills, Calif.; Kenneth W. Verge, Farmington, Mich.
[73] Assignee: The Bendix Corporation, Southfield, Mich.
[22] Filed: July 6, 1971
[21] Appl. No.: 159,900

[52] U.S. Cl. ....................418/59, 418/61, 418/69
[51] Int. Cl. .................................F01c 1/42
[58] Field of Search........................74/804, 805, 675; 418/59, 60, 61, 69; 188/69

[56] References Cited
UNITED STATES PATENTS

| | | | |
|---|---|---|---|
| 3,391,608 | 7/1968 | Huber | 418/61 |
| 3,291,062 | 12/1966 | Hermary | 418/59 |
| 1,969,651 | 8/1934 | Kretchmer | 418/60 |
| 3,661,402 | 5/1972 | Path | 188/69 |
| 3,305,059 | 2/1967 | Hutchinson et al. | 188/69 |

*Primary Examiner*—William L. Freeh
*Assistant Examiner*—G. P. LaPointe
*Attorney*—James E. Stephenson et al.

[57] ABSTRACT

An actuator assembly consisting of a plurality of actuators arranged in series and connected to a common output shaft for multiplying the torque available from the shaft wherein a selectively operable clutch is provided for each of the assemblies that is capable of disconnecting the assembly from the output shaft when desired. Each actuator includes a pair of floating ring gears mounted for epicyclic movement relative to a stationary gear and an output gear, and a summing gear disposed between the ring gears so that the combined movements of the ring gears are summed to obtain the desired movement of the output gear, thereby enabling increased output torque from each actuator when desired. In each actuator, a clutch is provided to disconnect the stationary gear and provide for free wheeling of the actuator in response to a predetermined signal.

5 Claims, 3 Drawing Figures

INVENTORS
George I. Boyadjieff
Kenneth W. Verge
BY
Olsen & Stephenson
ATTORNEYS

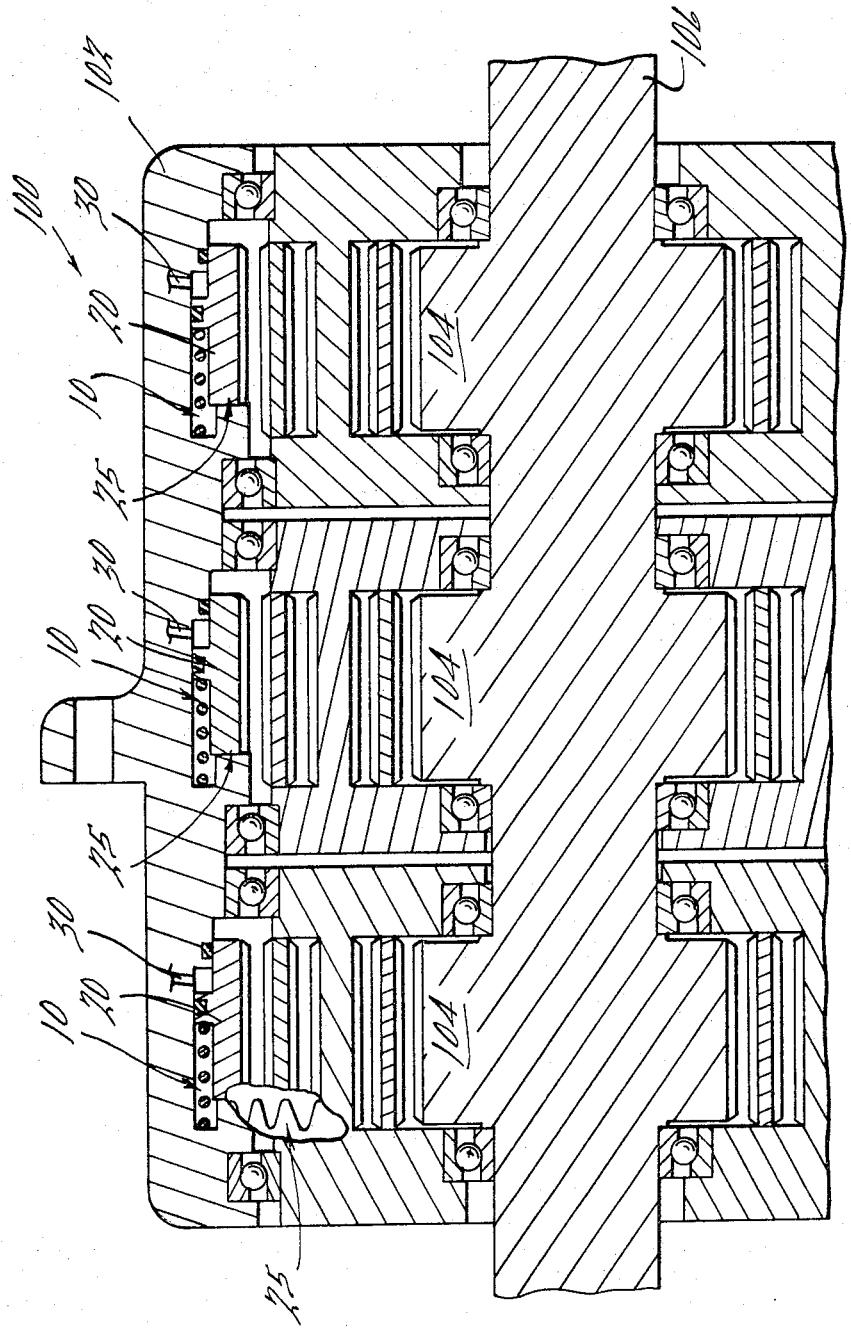

ACTUATOR ASSEMBLY

This invention relates generally to actuators of the type disclosed in copending application Ser. No. 667,459 filed Sept. 13, 1967 now abandoned and U.S. Pat. No. 3,516,765, owned by the assignee of this application. More particularly, this invention relates to an improved actuator of this general type which is of improved versatility by virtue of the incorporation therein of structure enabling the summing of output torques.

This invention provides an actuator assembly consisting of a housing and a plurality of actuators arranged in series in the housing for driving a single output shaft. Each actuator includes a stationary gear from which all reaction forces are derived, and the stationary gear is mounted on the housing by means of a releasable clutch mechanism thereby enabling selective disconnecting of the actuators for free wheeling operation. Each of the actuators, which can be used separately as well as in series combination with other actuators, includes a pair of coaxial floating ring gears mounted for epicyclic movement and a summing gear which is interposed between the ring gears and operates to sum the rotational forces which are generated by the ring gears and are ultimately applied to the output gear which drives the output shaft. Since the ring gears are separately driven, the actuator assembly of this invention is capable of operation in response to various inputs to achieve a wide variety of outputs thereby providing an actuator assembly of wide versatility. The actuator assembly is particularly useful in the flight control filed as a power boost motor integrated with a flight stabilization motor. The movement of one ring gear is responsive to manual input and the movement of the other ring gear is responsive to automatic stability input.

Further objects, features and advantages of this invention will become apparent from a consideration of the following description, the appended claims, and the accompanying drawing in which:

FIG. 3 is a longitudinal sectional view of a plurality of actuators of this invention arranged in series to form an actuator assembly.

Figures 1, 2:
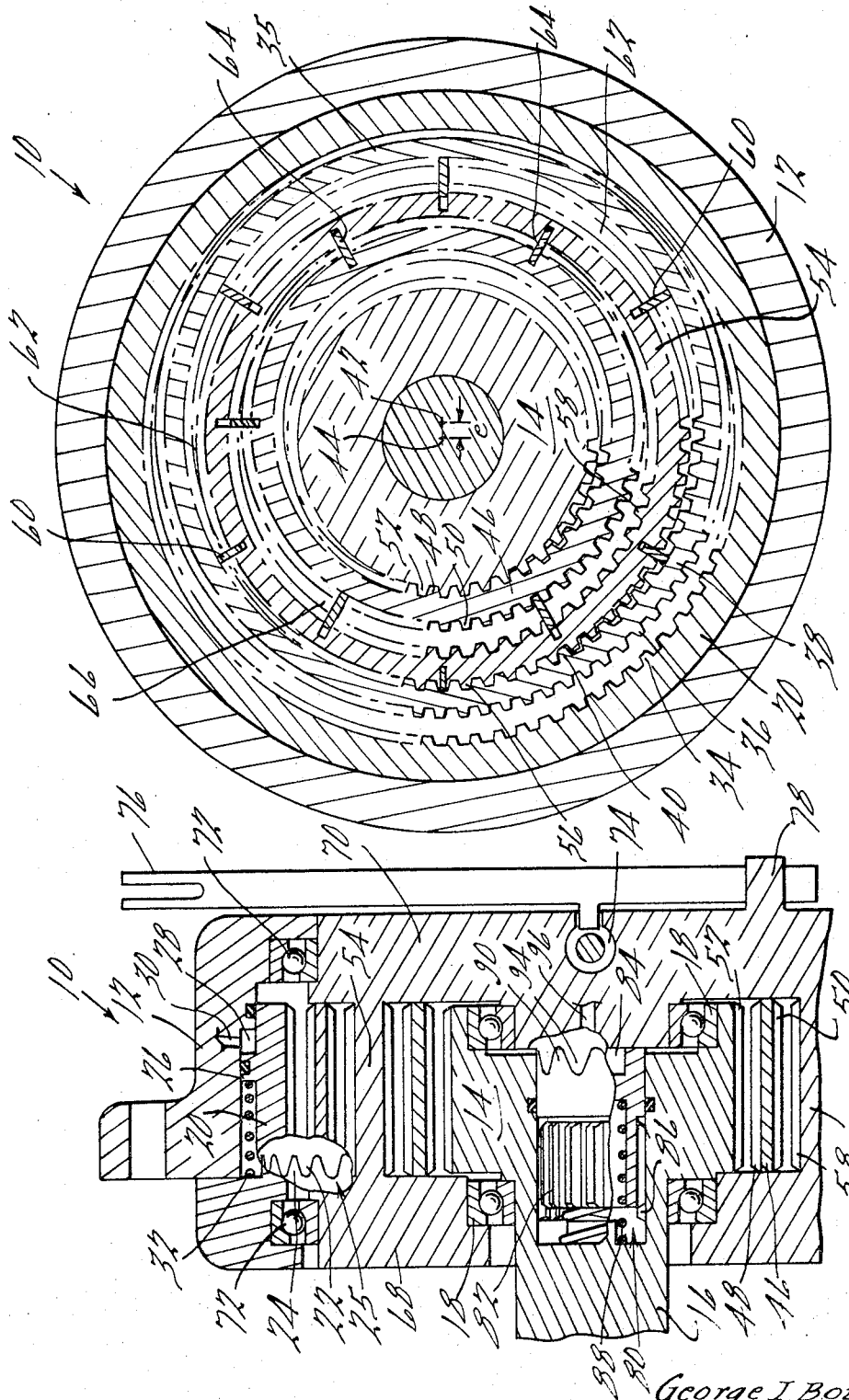
FIG. 1 is a transverse sectional view of an actuator of this invention.
FIG. 2 is a longitudinal sectional view of the actuator shown in FIG. 1.

With reference to the drawing, the actuator of this invention, indicated generally at 10, is illustrated in FIGS. 1 and 2 as including a housing 12 and an output gear 14 arranged within the housing 12 and formed integral with an output shaft 16 supported on bearings 18. A stationary gear 20, which is coaxial with the output gear 14, is mounted within the housing 12 and is releasably connected to the housing 12 by a clutch mechanism 25. The gear 20 is provided on one face with clutch teeth 22 which normally mesh with corresponding teeth 24 formed on the housing 12 so as to restrain rotation of the stationary gear 22 and maintain it in a stationary position within the housing 12. The gear 20 has a radially outwardly extending flange 26 which is disposed in sealing engagement with the housing 12 and cooperates with the housing 12 to form an annular chamber 28 which extends around the stationary gear 20. The chamber 28 is connected by a supply line 30 to a supply of fluid under pressure so that fluid in the chamber 28 is effective to apply a force on the flange 26 urging the stationary gear 20 to a position in which the teeth 22 thereon mesh with the housing teeth 24 to maintain the gear 20 in a stationary position. A spring 32 extends between the housing 12 and the flange 26 and applied a force to the flange 26 that opposes the force of the fluid in the chamber 28 thereon. As a result, in the event of the occurrence of a signal consisting of loss of fluid pressure in the chamber 28, the spring 32 is effective to move the stationary gear 20 in the housing 12 to a position in which the clutch teeth 22 and 24 are disengaged. After such disengagement, the stationary gear 20 is free to rotate in the chamber 12 so that thereafter, the actuator 10 will be ineffective to produce rotation of the output shaft 16.

As shown in FIG. 3, the stationary gear 20 has internal teeth 34 which are engaged, at one point or area 35 on the periphery of the stationary gear 20 with external teeth 36 on a first floating ring gear 38 having internal teeth 40. The floating ring gear 38 is smaller in diameter than the stationary gear 20 and is mounted so that its axis 42 is spaced from the axis 44 of the stationary gear 20 and the output gear 14 by a distance indicated at $e$ in FIG. 1. There are less teeth 36 on the ring gear 38 than there are teeth 34 on the stationary gear 20, and as a result, as the gear 38 is moved about the interior of the stationary gear 20, so as to experience epicyclic motion relative thereto, the ring gear 38 will also rotate, the gear ratio being determined by the relative numbers of the teeth 34 and 36.

A second floating ring gear 46, having internal teeth 48 and external teeth 50 is coaxial with the ring gear 38 and is positioned so that at one point on its periphery it has its teeth 48 positioned in meshing engagement with external teeth 52 on the output gear 14. There are more ring gear teeth 48 than there are output gear teeth 52 so that when the ring gear 46 is driven so as to experience epicyclic motion relative to the output gear 14, the output gear 14 will be rotated and the gear ratio will depend upon the relative numbers of the teeth 48 and 52.

Disposed between the floating ring gears 38 and 46 is a summing gear 54 having external teeth 56 and internal teeth 58. The teeth 56 on the summing gear 54 mesh with the internal teeth 40 on the ring gear 38 and correspond in number to the number of teeth 40 so that there is a 1:1 gear ratio between the ring gear 38 and the summing gear 54, precluding relative rotation of these gears. Similarly, the teeth 58 on the summing gear 54 mesh with and correspond in number to the external teeth 50 on the floating ring gear 46. Consequently, there is also a 1:1 gear ratio between the summing gear 54 and the floating ring gear 46 which precludes relative rotation of these gears.

A plurality of vanes 60 which are mounted on the summing gear 54 and the ring gear 38 divide the space between these gears into a plurality of discrete expansible and contractible fluid displacement chambers 62. Similar vanes 64 are mounted on and extend between the summing gear 54 and the ring gear 46 so as to divide the space therebetween into discrete fluid displacement chambers 66. As explained in detail in the aforementioned U.S. Pat. No. 3,516,765, when the chambers 62 are sequentially connected to a source of fluid under pressure and to tank, so as to cause the chambers to expand and contract in a successive sequence extending clockwise or counterclockwise around the axis 44, the ring gear 38 is caused to experience epicyclic motion relative to the stationary gear 20 so that the axis 42 orbits about the axis 44. Since the summing gear 54 is arranged in a 1:1 gear ratio relationship with the larger ring gear 38, rotation of the ring gear 38 with respect to the stationary gear 20 will cause a corresponding rotation of the summing gear 54.

Similarly, when the fluid chambers 66 are sequentially connected to a supply of fluid under pressure and to tank, the smaller ring gear 46 is caused to experience epicyclic motion relative to the output gear 14 so that the axis 42 of the ring gear 46 orbits about the axis 44, with the summing gear 54 functioning as a reaction gear from which the ring gear 46 derives the reaction force necessary to provide for a transmission of driving rotary motion of the ring gear 46 to the output gear 14. It can thus be seen that by virtue of the arrangement of the summing gear 54 between the larger ring gear 38 and the smaller ring gear 46, the orbiting movement of the ring gears 38 and 46 are summed to provide the driving force for the output gear 14. Thus, increased driving torque for the output gear 14 can be obtained in the actuator 10 relative to the actuators shown in the aforementioned copending applications wherein a single ring is employed.

In the illustrated form of the actuator 10, the summing gear 54 is provided with integral side plates 68 and 70 which are rotatably supported on bearings 72 carried by the housing 12. A servo valve 74, formed in the side plate 70 is connected to a mechanical input lever 76 pivotally supported on a pin 78 carried by the side plate 70. The servo valve 74 is connected by lines, not shown, to the fluid chambers 62 and 66 previously described and to a source of fluid under pressure. Both manual movement of lever 76 and supplemental fluid control of valve 74 can be effective to actuate the valve 74. The movement of the ring gears 38 and 46 is utilized to control the sequential supply of fluid under pressure to the chambers 62 and 66 in a manner described in detail in the aforementioned U.S. Pat. No. 3,516,765.

A clutch mechanism 80 is also provided in the actuator 10 for selectively connecting the output shaft 16 to the summing gear 70. The clutch mechanism 80 consists of a gear unit 82 mounted in a cavity 84 in the output gear 14 and spline connected to internal teeth 86 formed on the gear 14 and located in the cavity 84. A spring 88 urges the gear 82 toward a position in which end face teeth 90 on the gear 82 will mesh with clutch teeth 94 on the summing gear end plate 70. A conduit 96 is provided for supplying fluid under pressure to the cavity 84 to oppose the pressure of the spring 88 and maintain the gear 82 in a position in which the clutch teeth 90 and 94 are disengaged. In response to the occurrence of a signal consisting of loss of pressure in the chamber 84, the spring 88 will move the gear 82 to a position in which the teeth 90 and 94 are engaged so as to lock the output gear 14 to the summing gear 54. In such event, the output shaft 16 is driven directly by the summing gear 70 so that orbiting movement of the smaller ring gear 46 is ineffective to influence the output torque of the shaft 16.

It can thus be seen that in the actuator 10, the clutch mechanisms 25 and 80 are operable in response to predetermined signals to provide for altered operation of the actuator 10. In addition, the fluid signals to the fluid displacement chambers 62 and 66 are variable both as to magnitude and sequence so as to obtain a desired torque and running speed for the shaft 16.

In FIG. 3, an actuator assembly 100 consisting essentially of three actuators 10 arranged in a common housing 102 and having output gears 104 connected to a common output shaft 106, is illustrated. The advantage of the assembly 100 is the series connection of the actuators 10 so that they cooperate to drive the output shaft 106. Whenever there is a loss of pressure in a line 30, the corresponding clutch mechanism 25 functions to decouple the stationary gear 20 from ground thereby causing the actuator 10 to free wheel without driving the shaft 106. Thus, any number of actuators 10 can be connected in series, as shown in FIG. 3, so as to form an assembly 100 in which any one of the actuators 10 can be selectively decoupled for free wheeling movement while still providing rotation of the output shaft 106.

I claim:

1. An actuator comprising an output gear having an axis, a stationary gear arranged in a coaxial relation with said output gear, a first ring gear having an axis disposed eccentric relative to said output gear axis, said ring gear being disposed in meshing engagement with said stationary gear and being arranged relative to said stationary gear for epicyclic movement relative to said stationary gear in which said ring gear axis orbits around said output gear axis, a second ring gear disposed in a coaxial relation with said first ring gear and arranged in meshing engagement with said output gear, said second ring gear being mounted for epicyclic movement relative to said output gear in which the axis of said second ring gear orbits about said output gear axis, a summing gear arranged in a substantially coaxial relation with said ring and stationary gears, said summing gear being arranged in meshing engagement with said ring gears so that on application of a rotating force to said first ring gear causing said first ring gear to orbit around said output gear axis said summing gear is caused to rotate about said output gear axis, said second ring gear being operable on application of a rotating force thereto to orbit about said output gear axis and drive said output gear whereby said movements of said summing gear and said second ring gear are summed to produce said driven rotating movement of said output gear.

2. An actuator according to claim 1 further including means forming a first series of fluid displacement chambers between said first ring gear and said summing gear operable on sequential pressurization thereof to provide for said orbiting movement of said first ring gear, and means forming a second series of fluid displacement chambers between said summing gear and said second ring gear operable on sequential pressurization thereof to provide for said orbiting movement of said second ring gear.

3. An actuator according to claim 2 further including a housing supporting said stationary gear, and releasable clutch means releasably retaining said stationary gear in a fixed position on said housing.

4. An actuator according to claim 3 further including means rotatably supporting said summing gears on said housing, and coacting clutch means on said output gear and said summing gear operable in response to actuation thereof to releasably lock said output and summing gears together.

5. An actuator comprising a stationary gear having an axis, a rotatably mounted output gear arranged in a coaxial relation with said stationary gear, ring gear means drivingly engaged with said output gear and engaged with said stationary gear so as to derive the reaction force therefrom necessary to accomplish driving to said output gear in response to movement of said ring gear means, housing means arranged in a supporting relation with said stationary gear, and releasable clutch means connecting said stationary gear and said housing so as to releasably retain said stationary gear in a fixed position on said housing, said clutch means including coacting tooth members on said stationary gear and said housing, and means releasably maintaining said tooth members in engagement, wherein said means releasably maintaining said tooth members in engagement comprises coacting means on said housing and said stationary gear forming a fluid pressure chamber, and means for admitting fluid to said chamber so as to produce a resultant force directed so as to maintain said tooth members in engagement, and further including spring means extending between said housing and said stationary gear urging said tooth members out of engagement.

* * * * *